(12) United States Patent
Kannisto

(10) Patent No.: US 11,047,284 B2
(45) Date of Patent: Jun. 29, 2021

(54) MIXER BOX, A USE THEREOF AND A METHOD FOR MIXING

(71) Applicant: VOLVO PENTA CORPORATION, Gothenburg (SE)

(72) Inventor: Hannes Kannisto, Hisings Backa (SE)

(73) Assignee: VOLVO PENTA CORPORATION, Göteborg (SE)

( * ) Notice: Subject to any disclaimer, the term of this patent is extended or adjusted under 35 U.S.C. 154(b) by 0 days.

(21) Appl. No.: 16/486,240

(22) PCT Filed: Feb. 20, 2017

(86) PCT No.: PCT/EP2017/053788
§ 371 (c)(1),
(2) Date: Aug. 15, 2019

(87) PCT Pub. No.: WO2018/149509
PCT Pub. Date: Aug. 23, 2018

(65) Prior Publication Data
US 2020/0003101 A1 Jan. 2, 2020

(51) Int. Cl.
*F01N 3/20* (2006.01)
*F01N 3/28* (2006.01)
(Continued)

(52) U.S. Cl.
CPC .......... *F01N 3/2892* (2013.01); *B01F 5/0451* (2013.01); *B01F 5/0659* (2013.01); *F01N 3/208* (2013.01)

(58) Field of Classification Search
CPC .. B01F 3/04049; B01F 5/0451; B01F 5/0659; F01N 3/208; F01N 3/2066; F01N 3/2892;
(Continued)

(56) References Cited

U.S. PATENT DOCUMENTS 6,312,650 B1 * 11/2001 Frederiksen .......... F01N 3/2066
422/180
9,410,460 B2 * 8/2016 Hacklander ......... F01N 13/0097
(Continued)

FOREIGN PATENT DOCUMENTS

CN 105156181 A 12/2015
CN 106170613 A 11/2016
(Continued)

OTHER PUBLICATIONS

International Search Report and Written Opinion dated Jun. 8, 2017 in International Application No. PCT/EP2017/053788.
(Continued)

*Primary Examiner* — Audrey K Bradley
*Assistant Examiner* — Dapinder Singh
(74) *Attorney, Agent, or Firm* — Venable LLP; Jeffri A. Kaminski

(57) ABSTRACT

Mixer box for mixing, vaporization and decomposition of a liquid additive to the exhaust gas flow from a combustion engine, comprising a gas inlet (108), a gas outlet (109) and internal duct means establishing a gas flow path (A-H, a-h) from the gas inlet (108) to the gas outlet (109). The duct means includes a first duct portion (107) having an outer wall (171) and an inner wall (161), which is surrounded by the outer wall (171), such that the gas flow path through said first duct portion (107) is established inbetween. The first duct portion (107) is provided with at least two partitions (121-124) extending between the outer wall (171) and the inner wall (161), which separate the first duct portion (107) into at least two duct sections (101*a*, 101*b*, 102*a*, 102*b*) of which at least one is an upstream duct section (101*a*, 101*b*) and at least one is a downstream duct section (102*a*, 102*b*).

14 Claims, 7 Drawing Sheets

Figure 1:
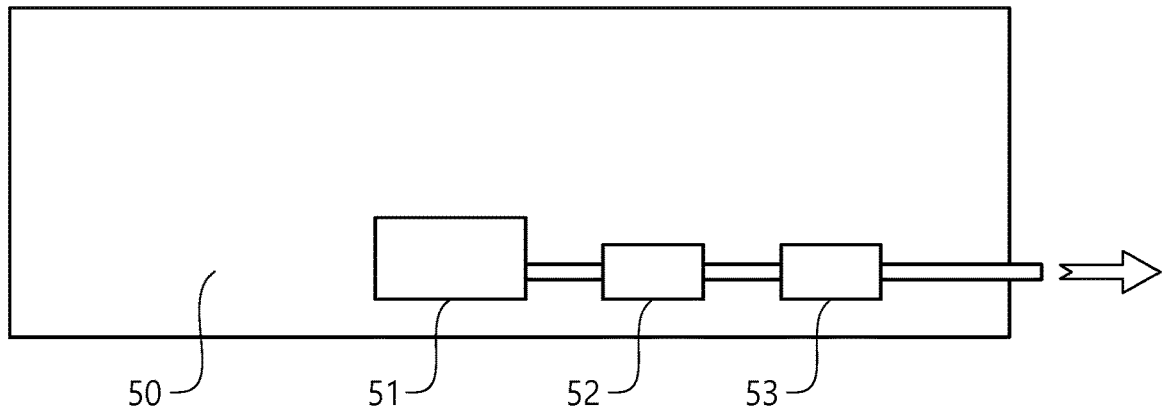

(51) Int. Cl.
*B01F 5/04* (2006.01)
*B01F 5/06* (2006.01)

(58) Field of Classification Search
CPC ............ F01N 2240/20; F01N 2470/08; F01N 2470/10; F01N 2470/14; F01N 2470/16; F01N 2470/24; F01N 2590/02; F01N 2590/08; F01N 2590/10; F01N 2610/02; F01N 2610/102; Y02A 50/2325; Y02T 10/24
USPC .......... 60/274, 286, 295, 299–301, 317, 324
See application file for complete search history.

(56) References Cited

U.S. PATENT DOCUMENTS

| | | | |
|---|---|---|---|
| 10,605,142 B2* | 3/2020 | Grosch | ................. F01N 3/0835 |
| 2006/0153748 A1* | 7/2006 | Huthwohl | ............. F01N 13/017 |
| | | | 422/172 |
| 2008/0245060 A1* | 10/2008 | Stieglbauer | ............. F01N 3/021 |
| | | | 60/311 |
| 2010/0139258 A1 | 6/2010 | Hackett et al. | |
| 2010/0212301 A1* | 8/2010 | De Rudder | ........... B01F 5/0659 |
| | | | 60/299 |
| 2011/0219755 A1 | 9/2011 | Muller-Haas | |
| 2012/0014843 A1* | 1/2012 | Birkby | ................. F01N 3/2066 |
| | | | 422/180 |
| 2014/0311133 A1 | 10/2014 | Norling et al. | |
| 2014/0360170 A1* | 12/2014 | Hacklander | ........... F01N 3/2066 |
| | | | 60/286 |
| 2015/0110681 A1 | 4/2015 | Ferront et al. | |
| 2015/0217230 A1 | 8/2015 | Reichert et al. | |
| 2015/0260070 A1* | 9/2015 | Reichert | ............. F01N 13/0097 |
| | | | 423/239.1 |
| 2015/0377110 A1 | 12/2015 | Sandberg et al. | |
| 2015/0377111 A1 | 12/2015 | Laurell et al. | |
| 2016/0194994 A1 | 7/2016 | Jayat | |
| 2018/0187584 A1* | 7/2018 | Neumann | ............... F01N 13/08 |

FOREIGN PATENT DOCUMENTS

| | | |
|---|---|---|
| DE | 102009036511 A1 | 2/2011 |
| WO | 2008/036606 A2 | 3/2008 |
| WO | 2009024815 A2 | 2/2009 |
| WO | 2012/038072 A1 | 3/2012 |
| WO | 2014/107129 A1 | 7/2014 |
| WO | 2016169709 A1 | 10/2016 |

OTHER PUBLICATIONS

International Preliminary Report on Patentability dated Apr. 30, 2019 in International Application No. PCT/EP2017/053788.
China Office Action dated Dec. 3, 2020 in corresponding China Patent Application No. 201780086792.0, 19 pages.

* cited by examiner

MIXER BOX, A USE THEREOF AND A METHOD FOR MIXING

FIELD OF THE INVENTION

The present invention in a first aspect relates to a mixer box for mixing and complete or partial vaporization and/or decomposition of a liquid additive to the exhaust gas flow from a combustion engine, which mixer box has a gas inlet, a gas outlet and internal duct means establishing a gas flow path from the gas inlet to the gas outlet, which duct means includes a first duct portion having an outer wall and an inner wall, the inner wall being surrounded by the outer wall, such that the gas flow path through said first duct portion thereby is established between said walls.

In a second aspect, the invention relates to a use of the invented mixer box.

BACKGROUND OF THE INVENTION

Mixing and vaporization and/or decomposition of a liquid into a gas stream are dependent on droplet break-up, turbulence in the gas flow and temperature. Fewer opportunities for droplet break-up and turbulence means a longer reaction time at a certain temperature, i.e. longer piping is required to reach a well-mixed gas flow. A well-mixed gas flow is important for the function of e.g. different catalysts such as the diesel oxidation catalyst (DOC) using hydrocarbon/fuel or the selective catalytic reduction (SCR) using urea.

Illustrative examples of mixing a liquid additive into a stream of exhaust gas for subsequent treatment can be found e.g. in WO 14107129, WO 16169709, US 2008245060, US 2011219755, US 2014311133, US 2014360170, US 2015217230, US 2015377110, US 2015377111, US 2015110681, US 2016194994 and DE 102009036511.

In particular the mentioned WO 14107129 discloses a mixer box where the mixer box is integrated with a silencer. A silencer, however, not necessarily is included in the mixer box of the present invention. The disclosure relates to a silencer for a combustion engine, which silencer comprises a casing with a substantially circular cylindrical shell surface, a first end element and a second end element, at least one inlet for leading an exhaust flow into the casing and at least one outlet for leading the exhaust flow out from the casing. The silencer comprises also a selective catalytic reduction (SCR) purification system which comprises a SCR substrate, a vaporisation pipe and an arrangement for adding a reducing agent to the exhaust flow in order to reduce NOx contents of the exhaust flow. The silencer further comprises a cylindrical particle filter situated between a first space and a first duct such that the exhaust gases are led in a substantially radial direction through the filter. The exhaust flow is also caused to pass through a second duct on the outside of the vaporisation pipe before the SCR substrate in order to warm the vaporisation pipe. The silencer is of compact configuration and is flow-optimised such that the formation of urea crystals may also be reduced. US2015260070 discloses a mixing box as set out in the preamble of claim 1. Further relevant mixer boxes are disclosed in WO2012038072, WO2008036606 and US2010139258.

SUMMARY OF THE INVENTION

An object of the present invention is to achieve a more efficient mixing of the fluid droplets with the exhaust gas than is obtained with known mixing boxes. In particular an object is to thereby achieve a sufficient mixing level in a mixing box that can be more compact than traditional mixing boxes in this field.

According to a first aspect of the invention, the object is achieved in that a mixing box of the kind specified in the preamble of claim 1 includes the specific features specified in the characterizing portion of claim 1. Thus, the duct means includes a second duct portion, which is surrounded by the first duct portion, and where the characterizing portion defines a liquid injection means arranged to inject liquid into the second duct portion, and where the liquid injection means is provided in an end wall of the second duct portion.

This thus takes place after the exhaust gas has flown from the upstream duct section(s) into the second duct portion, which inflow creates turbulence in the gas flow. The injection thereby takes place at a location where the flow is turbulent. It is particularly efficient for the mixing that turbulence is present already where the liquid is injected. When there is two or more upstream duct sections there may also be a re-mixing when entering into the second duct portion which further increases the turbulence at the location of the fluid injection. Providing the fluid injection means to inject into the mixing box also eliminates the need for a separate injection device ahead of the mixing box.

In the following this first duct portion, for the sake of simplicity, will be referred to as being annular, which normally will be the case. It is, however, to be understood that the shape of the inner and outer walls not necessarily is circular but may be elliptic or even polygonal. The inner and outer walls normally will be concentric, but the invention is not restricted to that. The inner and outer walls do not necessarily have constant diameter but may vary along its respective axial extension.

Thanks to that this annular first duct portion is separated into two or more duct sections it will be possible that one of the duct section forms one part of the gas flow path through the duct means and another one forms another part of the gas flow path. To arrange two parts of the gas flow path within one and the same annular space results in a compact layout of the mixer box while maintaining a sufficient degree of mixing, and thereby allows after-treatment, e.g. SCR-treatment to come close to the combustion engine.

One of the duct sections is upstream the other one and is defined as the upstream duct section; the other one consequently is defined as the downstream duct section.

In the present application mixer box is to be understood as the device that enhances the mixing of the droplets into the gas stream. The injection of the fluid may take place within the mixing box per se, or may take place before the exhaust gas enters the mixing box.

Terms like "radial" and "axial" and the like, in the following are related to the centre axis of the annular duct portion.

The terms "upstream" and "downstream" relate to the gas flow path through the duct means. When there are two details of the same kind, e.g. re-mixing chambers, the distinguishing upstream/downstream-labels for these refer solely to their mutual relative positions in the gas flow path and not necessarily to their positions relative other details.

According to a preferred embodiment of the invented mixer box, the number of partitions is at least four and the number duct sections is at least four, and every second duct section as seen in the circumferential direction is an upstream duct section and every second duct section is a downstream duct section.

The gas flow path thus takes place through two parallel arranged upstream duct sections and correspondingly through the downstream duct sections. Dividing the gas flow path into parallel flows through parts of the duct means increases the possibility to create turbulence within the gas flow path which increases the effectivity of mixing.

According to a further preferred embodiment, the duct means includes an upstream re-mixing chamber and each upstream duct section has a gas outlet connected to and communicating with the upstream re-mixing chamber.

By providing a re-mixing chamber after the upstream duct section, the separated gas flows will be unified again and mix with each other. Thereby a strong turbulence is created, which thus further increases the efficiency of mixing the droplets into the exhaust gas.

According to a further preferred embodiment, the duct means includes a downstream re-mixing chamber and each downstream duct section has a gas outlet connected to and communicating with the downstream re-mixing chamber.

The provision of a re-mixing chamber after the downstream duct sections has advantages similar to those of the embodiment mentioned next above. Particularly efficient with regards to attain turbulence conditions is when both an upstream re-mixing chamber and downstream re-mixing chamber are present.

According to a further preferred embodiment, the duct means is arranged to provide a first turn of the gas flow direction 180°.

Figure 7:
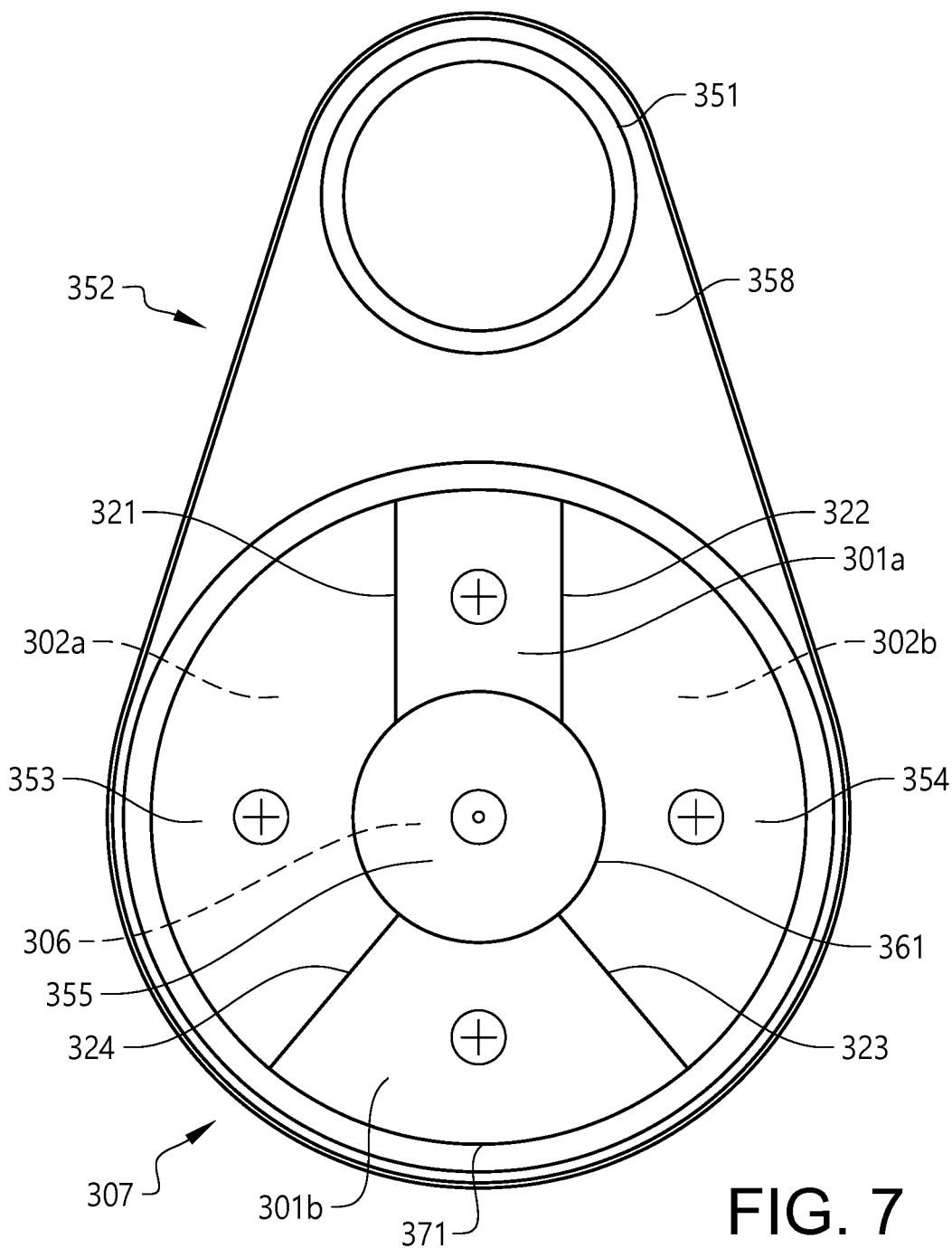
Figure 8:
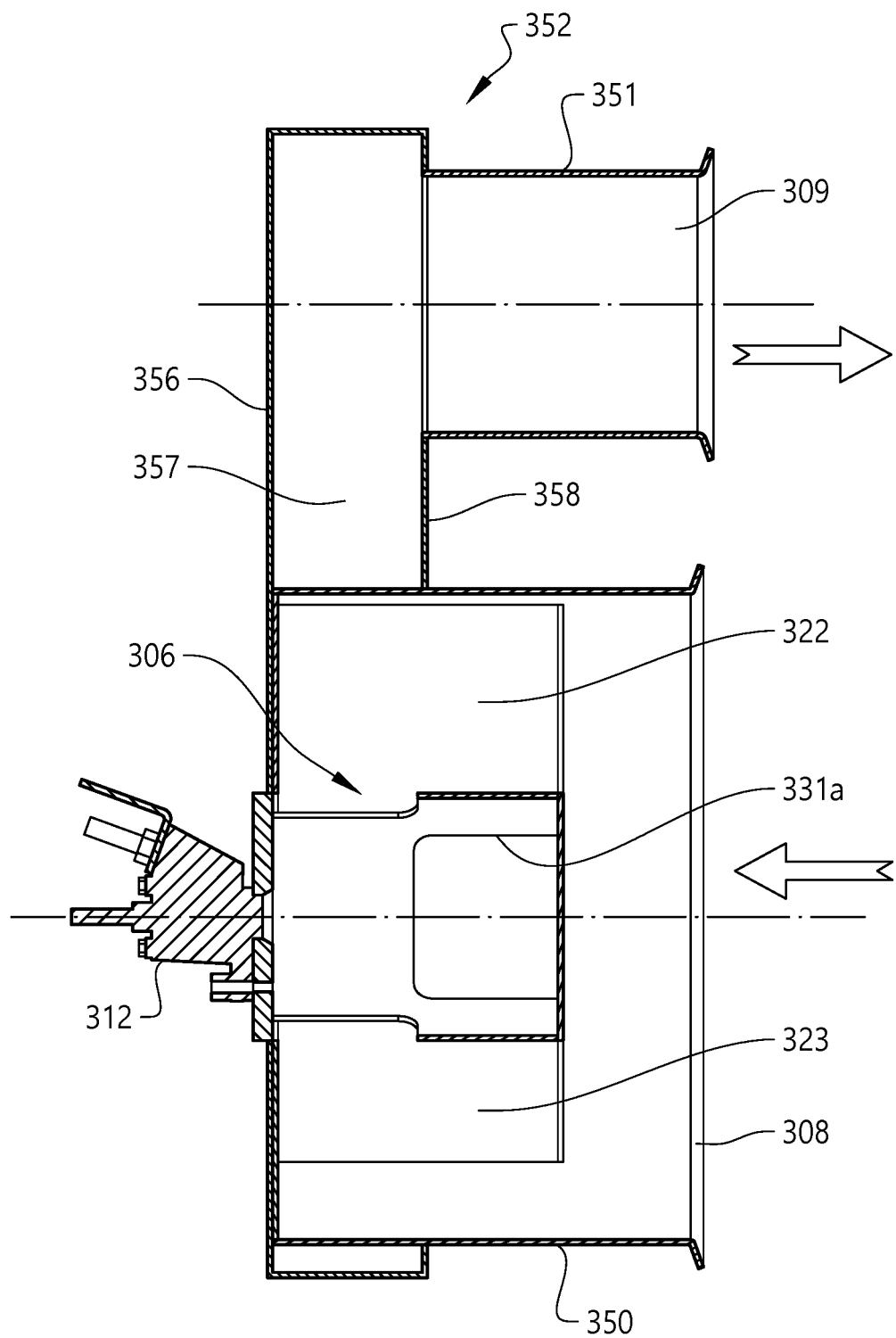
Figure 9:
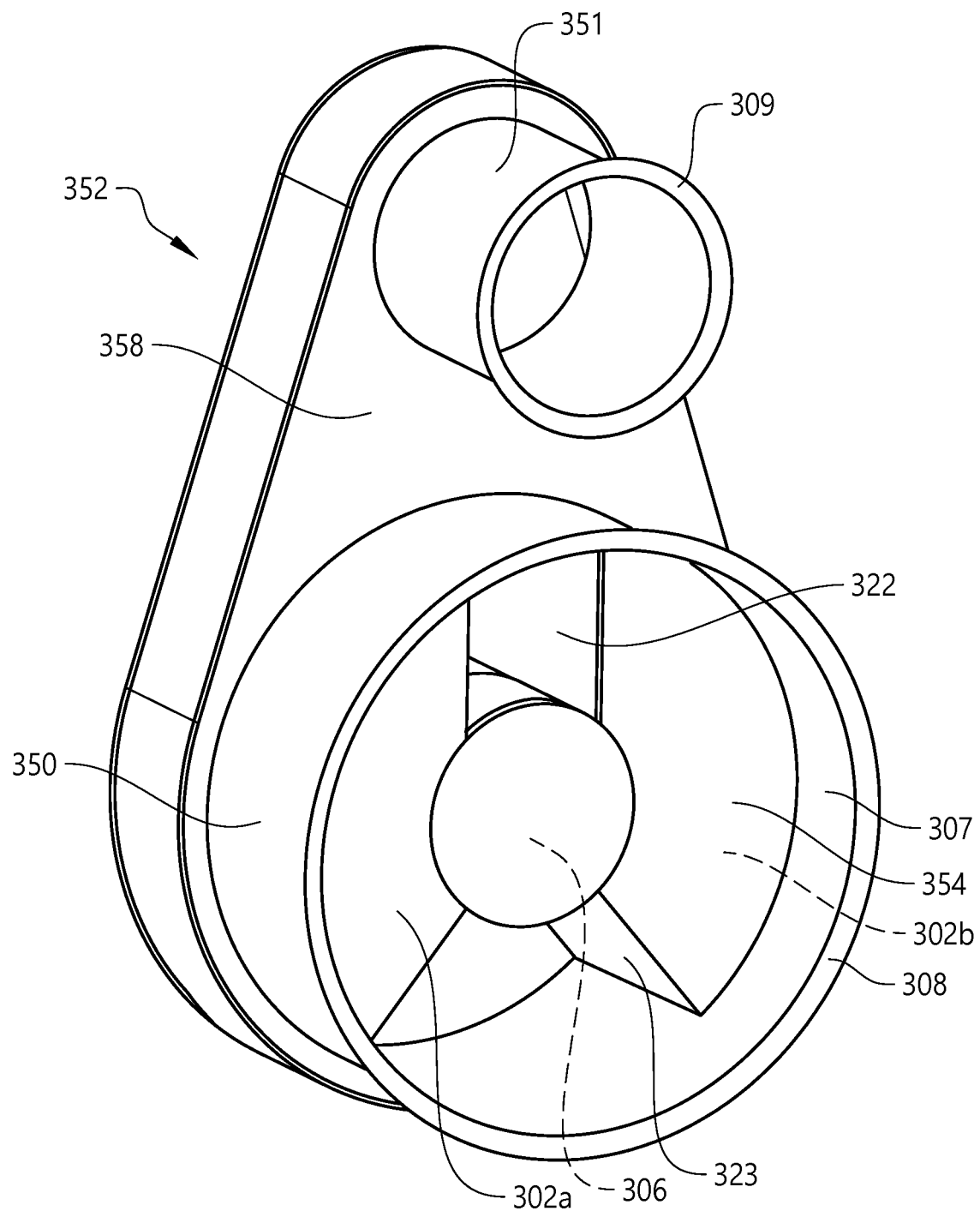
Figure 10:
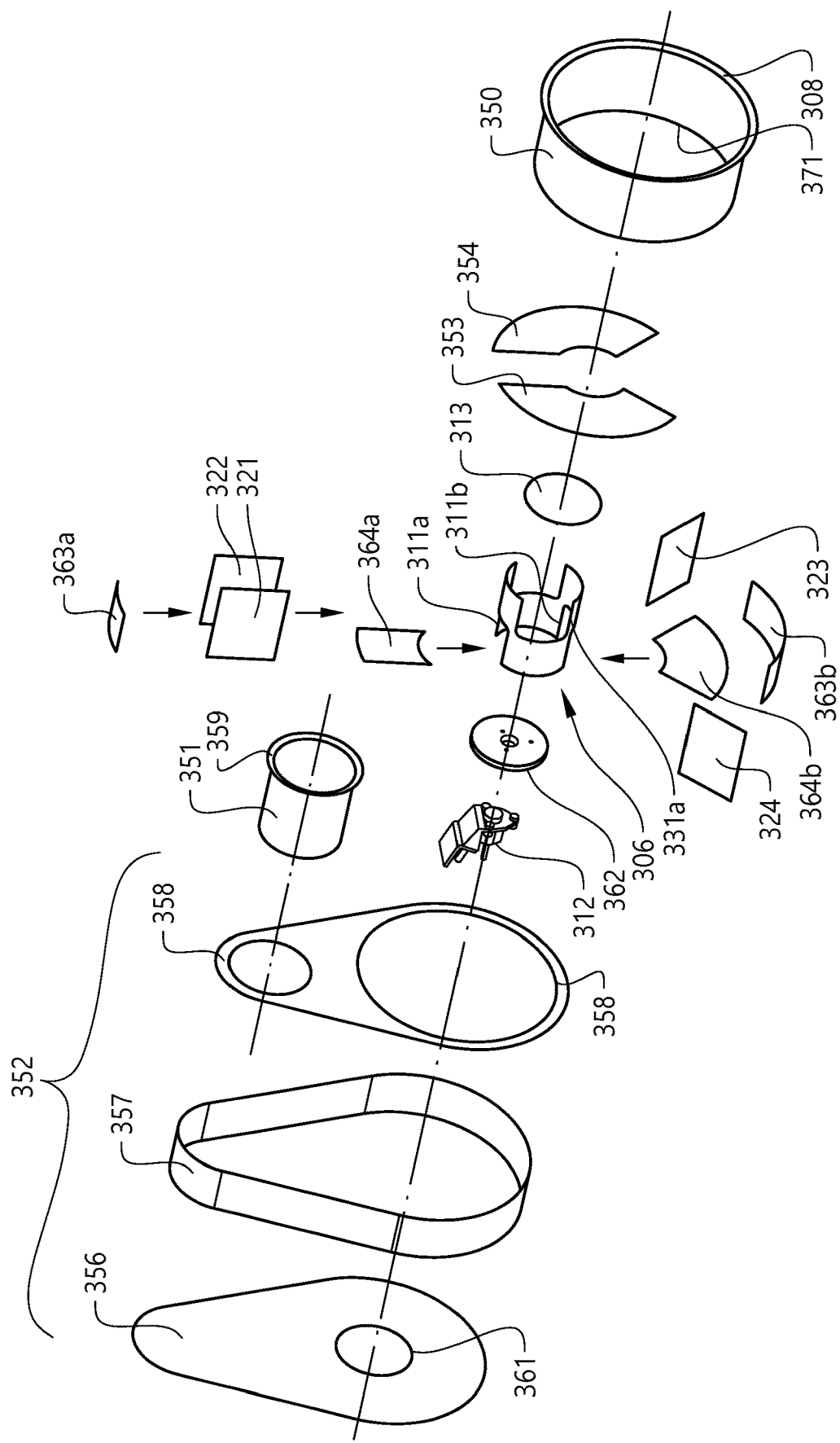

Such a sharp turn also will increase turbulence in the gas flow, thereby increasing the mixing efficiency. The turn may advantageously be arranged in connection with the outflow of the exhaust gas into a re-mixing chamber, but may alternatively be arranged somewhere else in the gas flow path.

According to a further preferred embodiment, the duct means is arranged to provide a second turn of the gas flow direction at least 90°, which first and second turns are located at different positions in the gas flow path.

With such a further turn, the turbulence will be further enhanced.

The pipe-in pipe arrangement provides a very space-saving construction of the duct means, since within one and the same outer pipe at least three different parts of the gas flow path will be housed, e.g. one in the central pipe and two in the annular space. The pipe-in-pipe arrangement also allows for these various parts of the gas flow path to be connected without extensive connection piping. This further contributes to the compactness of the mixer box. The arrangement is also advantageous with regards to attaining sharp turns and re-mixings of the gas flow, which as mentioned above contributes to higher turbulence.

According to a further preferred embodiment, the second duct portion has an outer wall that is common to the inner wall of the first duct portion.

Thereby unnecessary waste of space is avoided. The common wall also increases heat transfer between the gas in the inner pipe and the gas in the annular space, which in many cases may be desirable.

According to a further preferred embodiment, the duct means has the upstream duct section(s) located upstream of the second duct portion, and the second duct portion located upstream of the downstream duct section(s).

This means that the gas flow path first passes through (a) duct section(s) in the annular space, then through the central pipe, and thereafter through another/other duct section(s) in the annular space. The gas flow thereby may be in a first axial direction, followed by a flow in the opposite direction and thereafter in the first axial direction. This makes it easy to attain sharp turnings of the gas flow and the effect thereof on the turbulence. When a plurality of upstream duct sections are present and/or a plurality of downstream duct sections it also leads to re-mixing of the gas flows. In that case this embodiment profits particularly from the advantages of creating turbulence, and is here attained easily and space-saving.

According to an alternative preferred embodiment, the duct means has the second duct portion arranged upstream of the upstream duct section(s), and the upstream duct section(s) located upstream of the downstream duct section (s).

For some applications this consecutive order may be easier to adapt to the related technical details such as the combustion engine and an SCR-system. This embodiment is also particularly adapted to a system where the fluid injection is performed prior to the mixer box. However, internal fluid injection means, e.g. injecting into the second duct portion, is not excluded in this embodiment.

According to a further preferred embodiment, the duct means includes a heating surface arranged to be hit by the gas flow and heat the gas.

Thereby the gas temperature is increased and thereby compensate for the temperature fall due to the injection of liquid, which is advantageous for increasing mixing of the droplets into the exhaust gas.

Accord to a further preferred embodiment, when the second duct portion is surrounded by the first duct portion and has an outer wall that is common to the inner wall of the first duct portion, the heating surface is a part of a the common wall and/or an end wall of the second duct portion, and where gas flowing in the first duct portion acts as a heat source for heating the heating surface.

Thereby heat losses due to injection of liquid is regained such that the temperature where the mixing takes place becomes almost as high as when the exhaust gas enter the mixer box. The embodiment eliminates the need for external heat supply, although such may also be present in order to further increase the temperature.

The invention also relates to a combustion engine system including a mixer box according to the present invention, in particular to any of the preferred embodiments thereof.

The invention also relates to a vehicle, a vessel or a stationary plant including a combustion engine system according to the present invention.

According to the second aspect of the invention, the object is met by a use of the mixer box according to the present invention, in particular to any of the preferred embodiments thereof, wherein the liquid additive contains urea and wherein the gas/liquid-mixture is used for selective catalytic reduction.

BRIEF DESCRIPTION OF THE DRAWINGS

FIG. 1 is a schematic side view of a combustion engine system according to an aspect of the invention and of an apparatus, of which the engine system is a part.

FIG. 2 is a sketch illustrating the general principle of the invention

FIG. 3 is a sketch illustrating the principle of the invention according to a first example.

FIG. 4 is a sketch as seen along line IV-IV of FIG. 2.

FIG. 5 is a sketch illustrating a further example not part of the invention.

FIG. 6 is a sketch as seen along line VI-VI of FIG. 5.

FIG. 7-10 illustrate an example embodiment of the invention with an operating principle according to FIGS. 3 and 4, and of which FIG. 7 is an end view from a front end, FIG. 8 is a side view, FIG. 9 is a perspective view and FIG. 10 is a split view.

With reference to the appended drawings, below follows a more detailed description of example embodiments of the invention.

DESCRIPTION OF EXAMPLE EMBODIMENTS

FIG. 1 illustrates the context in which the mixer box 52 according to the invention is intended to be used. Reference numeral 50 represents an apparatus having a combustion engine 51. The apparatus 50 may be a vehicle, vessel or a stationary plant. Exhaust gas from the combustion engine 51 is led to a mixer box for mixing injected liquid to the exhaust gas. The injection may be performed inside the mixer box 52 or between the combustion engine 51 and the mixer box 52. From the mixer box the gas is led to a treatment unit 53, e.g. for SCR.

Figure 2:
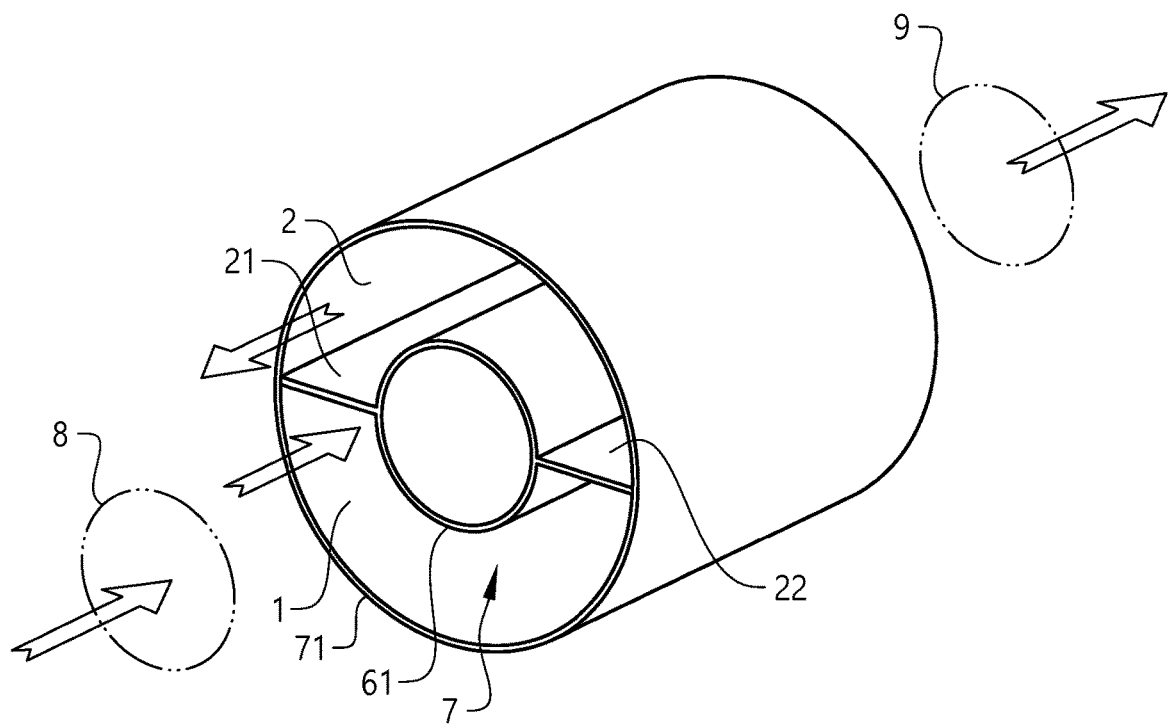

FIG. 2 illustrates the basic principle of the invention by a sketch depicting parts of the duct means throw which the exhaust gas flows through the mixer box. The exhaust gas enters the mixer box through an inlet 8 and leaves the mixer box through an outlet 9. The FIG. 2 illustrates only the part of the duct means that is of interest for presenting the principle of the invention. The duct means has an annular duct portion 7 with an outer wall 71 and an inner wall 61. The annular duct portion is by two partitions 21, 22 divided into duct sections 1, 2. The duct means connects these duct sections to the non-shown parts of the duct means such that the exhaust gas passes an upstream duct section 1 and at a later stage through a downstream duct section 2.

The gas through these duct sections 1, 2 may be in the same directions or in the opposite directions. The gas flow may occur directly from the upstream duct section 1 to the downstream duct section 2. The gas flow may alternatively occur through intermediate piping between the two duct sections 1, 2. The inner wall 61 may be the outer wall of an internal pipe forming a second duct portion of the duct means. The exhaust gas may already contain liquid droplets when entering the mixing box or the liquid may be injected within the mixer box. The duct portion 7 is not necessarily annular, i.e. the outer 71 and inner 61 walls may have other shapes than circular.

Figure 3:
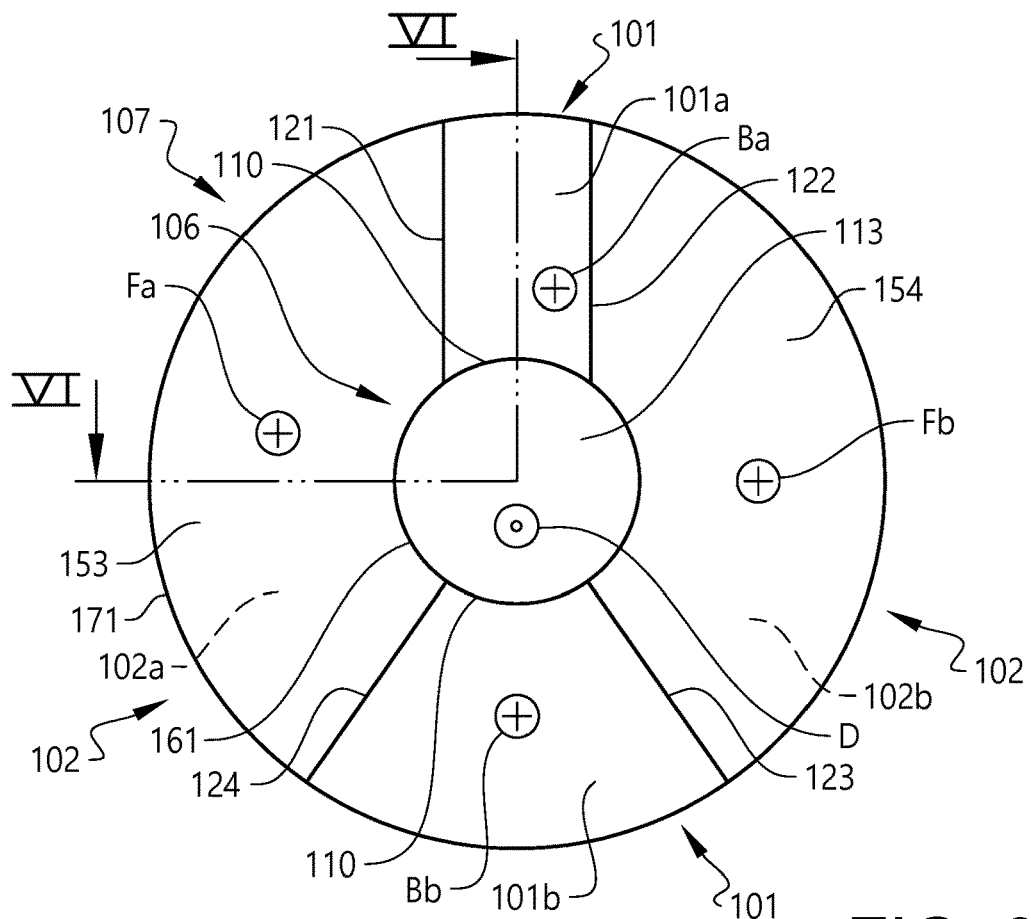
Figure 4:
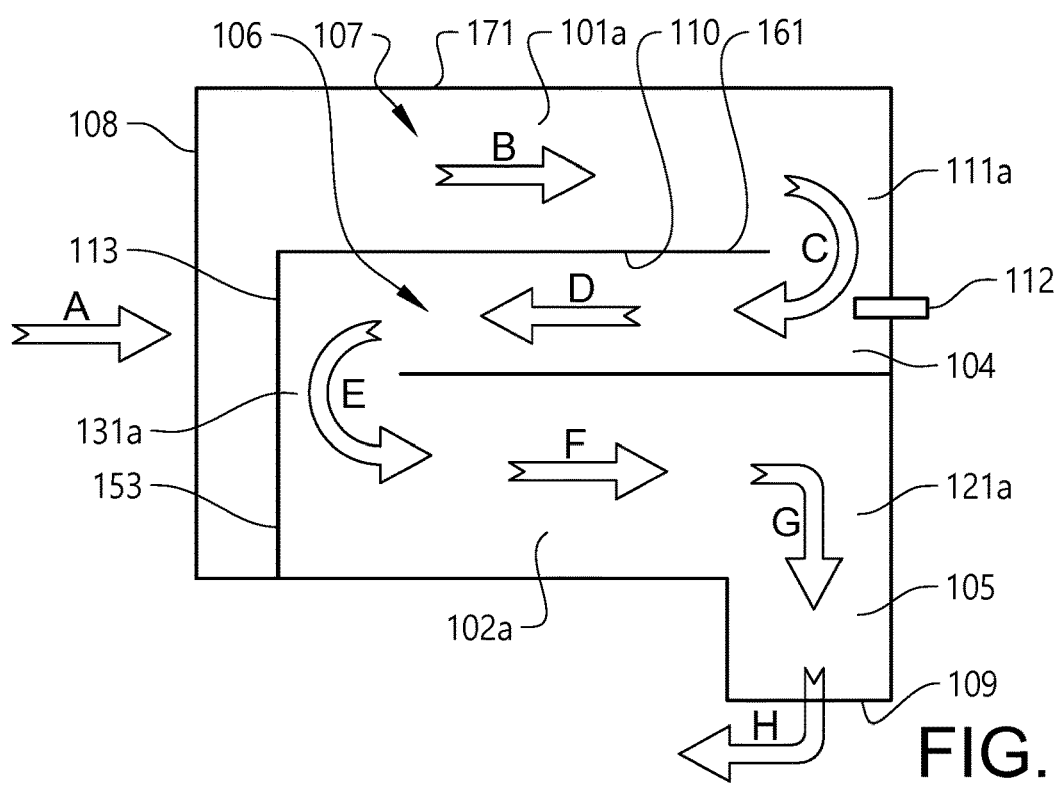

FIGS. 3 and 4 illustrate the principle of the invention according to a first example thereof, and schematically depict a mixer box from the front end (FIG. 3) and from the side (FIG. 4). Generally the mixing box has an outer pipe forming a first duct portion 107, which surrounds an inner pipe forming a second duct portion 106. The outer duct portion 107 is annular and has an outer wall 171 and an inner wall 161. The inner wall 161 is simultaneously the outer wall of the second duct portion 106.

As can be seen in FIG. 3, the first duct portion 107 has four partitions 121-124 connecting the outer wall 171 and the inner wall 161, which partitions 121-124 extend in the axial direction. The partitions 121-124 divide the duct portion 107 into four duct sections 101a, 101b, 102a, 102b. A front plate 113 covers the second duct portion 106 (the inner pipe), which front plate constitutes an end wall 113 of the second duct portion 106. Front plates 153, 154 cover the downstream duct sections 102a, 102b. The duct sections 101a, 101b are upstream duct sections and are arranged in parallel with regards to the flow path. The duct sections 102a, 102b are downstream duct sections and are likewise arranged in parallel. The front plates 113, 153, 154 prevent the inflowing gas to enter anywhere else than into the upstream duct sections 101a, 101b.

As can be seen in FIG. 4 the mixer box has a gas inlet 108 for exhaust gases and an outlet 109 for the gases after having been mixed with the fluid droplets. The gas inlet 108 communicates with the upstream duct sections 101a, 101b. The upstream duct section 101a communicates by an outlet 111a through the inner wall 161 with an upstream re-mixing chamber 104. A corresponding outlet (not shown) is arranged in the radially opposite side of the inner wall 161 and communicates the upstream duct section 101b with the upstream re-mixing chamber 104. Both these outlets are located axially at the end of the mixing box that is opposite to the gas inlet 108.

The second duct portion 106, i.e. the central pipe, has a first outlet 131a communicating with the downstream duct section 102a, and has a second outlet (not shown) communicating with the other downstream duct section 102a. These two outlets are in FIG. 3 located opposite each other around the three o clock position and the nine o clock position respectively, (but axially offset of the plane of the paper). The downstream duct section 102a communicates with the gas outlet through an outlet 121a. The other downstream duct section 102b in the same way communicates through a (not shown) opening with the gas outlet 109.

With reference to FIG. 4, the region adjacent the rightmost end (in FIG. 4) of the second duct portion 106 forms an upstream re-mixing chamber 104. And adjacent the region at the rightmost end of the downstream duct sections 102a, 102b a second re-mixing chamber 105 is established.

A liquid injection means 112 is provided in the right end wall of the duct portion 106, through which liquid containing urea is injected.

The exhaust gases A from the combustion engine (not shown) flows into the mixing box from the left in FIG. 3 and enters through the gas inlet 108 into the first duct portion 107 as can be seen by arrow B in FIG. 4. The gas flow thereby is split into two parallel sub-flows $B_a$ and $B_b$ (see FIG. 3) through the upstream duct sections 1a, 1b, respectively.

The gas then flows through their respective outlet 111a, arrow C into the inlet end (to the right in FIG. 4) of the second duct portion 106. The two sub-flows thereby are re-unified in the re-mixing chamber 104 into a single gas flow D through the second duct portion 106. The re-mixing chamber 104 is located within the second duct portion 106, primarily at the rightmost end thereof. However, the mixing process of course to some extent continues along the complete extension of the second duct portion 106. The fluid injection means 112 injects the fluid into the gas flow in the first re-mixing chamber, i.e. at a location where the gas flow turns 180° simultaneously as the separated gas flows are re-mixed.

At the left end (FIG. 4) of the second duct portion 106 the gas flows out, arrow E, through the respective outlet, of which only outlet 131a is visible in the figures, into a respective downstream duct section 102a, 102b. The exhaust gas then again is divided into two sub-flows $F_a$, $F_b$ in the respective downstream duct section, and flows in the right direction in FIG. 4. At the right end of the downstream duct sections 102a, 102b, the gas flows out, arrow G, through a respective outlet 121a into the second re-mixing chamber 105 and from there to the gas outlet 109.

The outlet 111a from each of the upstream duct section 101a, 101b may extend axially over a substantial part of the extension of the inner pipe; up to half its extension. The same relates to the outlet 131a from the second duct portion 106 into the respective downstream duct section 102a, 102b. Circumferentially, these outlets 111a, 131a may extend all the way between two adjacent partitions, e.g. the outlet 131a may extend along the inner wall 161 all the way between partitions 121 and 124.

The inner wall 161 may have a portion 110 that acts as a heating means for the exhaust gas flow D in the second duct portion 106. This portion is heated by the exhaust gas flow B in the upstream duct sections 101a, 101b. Also the front plate 113 may in a similar way be used as a heating means for the mixed gas.

Each of the outlets 111a, 131a and 121a may be formed by a perforated plate.

Figure 5:
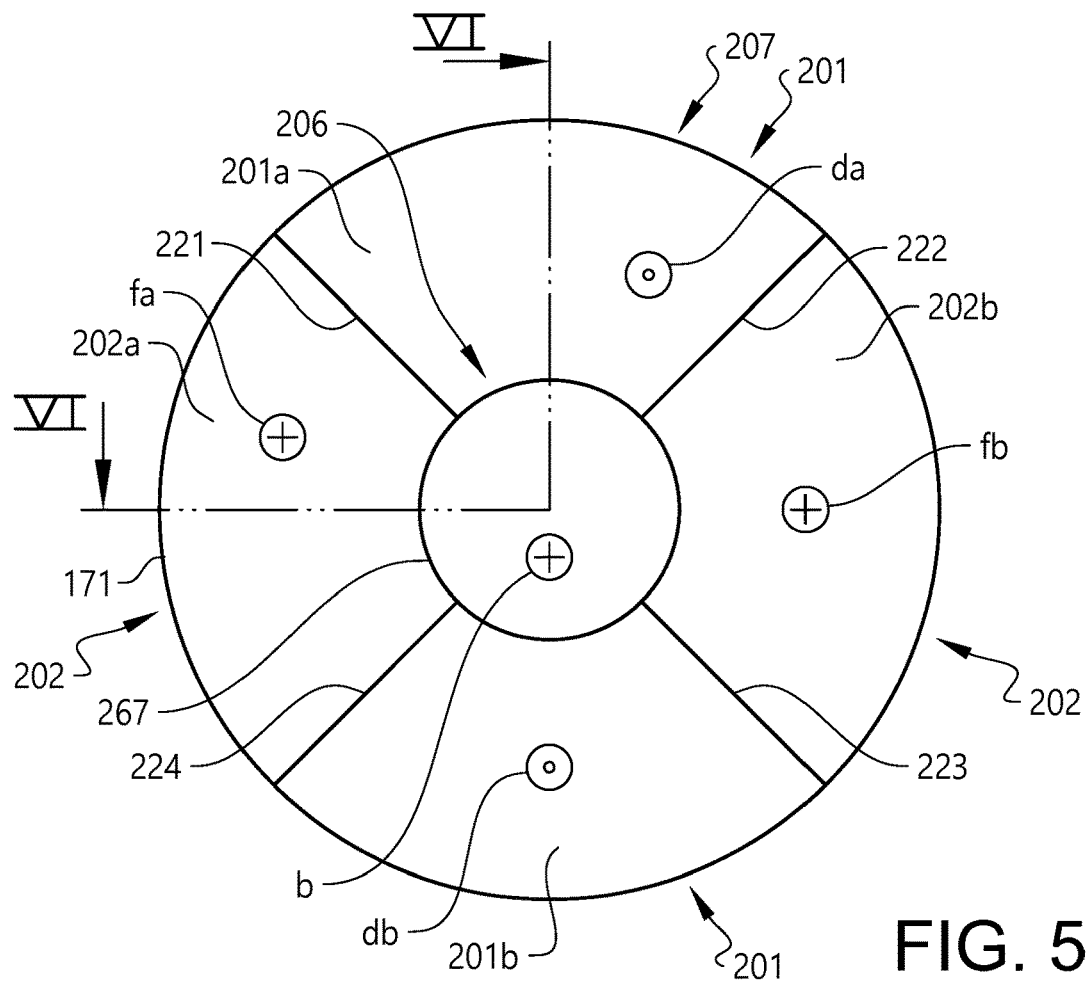
Figure 6:
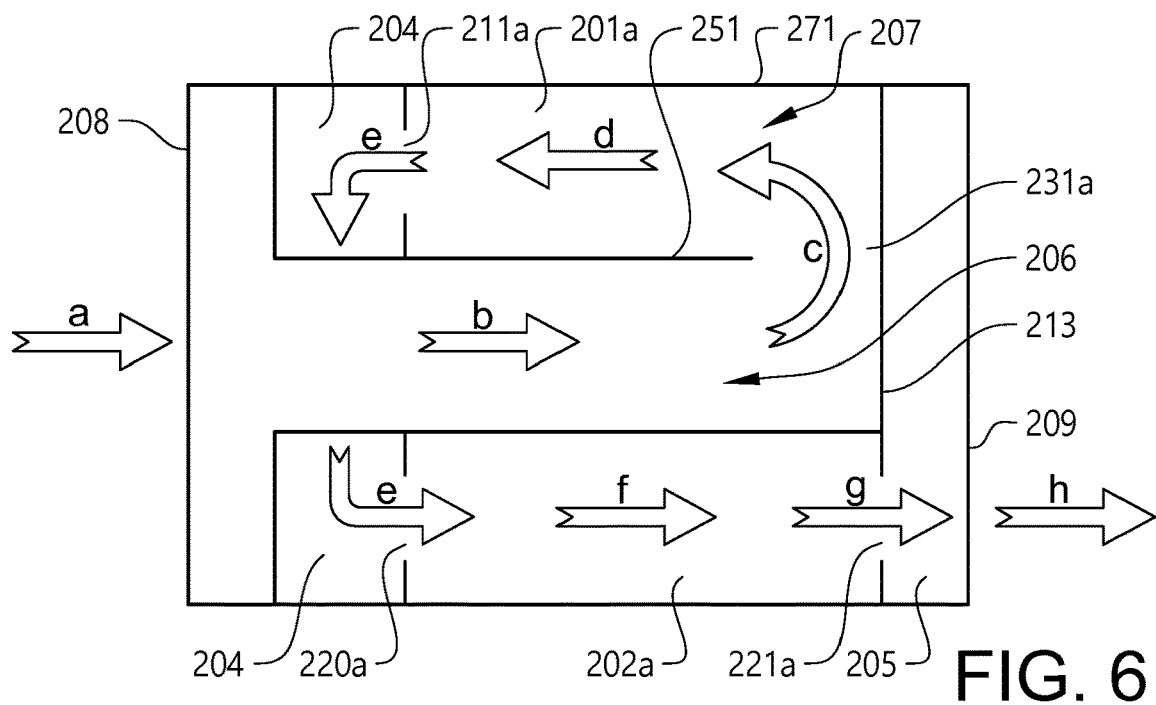

FIGS. 5 and 6 illustrates an example that is not part of the invention, since there is no injection device in the urea mixer box as such. Here a duct means connects the gas inlet 208 to the gas outlet 209. Also in this example the duct means includes a first duct portion 207 with an outer wall 271 and an inner wall 261, which inner wall 261 is a pipe forming a second duct portion 206. An annular space is formed between the walls 271, 261, which annular space by four partitions 221-224 is divided into two upstream duct sections 201a, 201b and two downstream duct sections 202a, 202b.

At the right end (FIG. 6) the second duct portion 206 communicates via a respective outlet 231a with the respective upstream duct section 201a, 201b. The upstream duct sections 201a, 201b through a respective outlet 211a communicate with an upstream re-mixing chamber 204. The downstream duct sections 202a, 202b communicate through a respective inlet 220a with the upstream re-mixing chamber 204 and through a respective outlet 221a with a downstream re-mixing chamber 205 connected to the gas outlet 209.

The exhaust gas enters, arrow a, the mixer box through the gas inlet 208 and flows through the second duct portion 206, i.e. the inner pipe, and then turns 180°, arrow c, when entering through the respective inlet 231a to the respective upstream duct section 201a, 201b in the annular space, whereby the gas flow is split into two separate flows arranged in parallel. The gas thus flows in the axially opposite direction, arrow d in these sections. Thereafter the gas flows through the respective outlets 211a into the upstream re-mixing chamber 204, and from there through the respective inlets 220a, to the respective downstream duct section 202a, 202b. The gas is thereby again turned 180°, arrows e, such that the flow, arrow f, through the downstream duct sections 202a, 202b is in the same axial direction as in the first duct portion 206. When entering the upstream re-mixing chamber 204 the gas flow is unified and when leaving this mixing chamber 204 the gas flow is split again. From the downstream duct sections 202a, 202b, the gas flows through the respective outlets 221a into the downstream re-mixing chamber 205, where the gas flows thus are unified again, and then from the downstream re-mixing chamber 205 to the gas outlet 209.

In this example the injection of liquid may be arranged in a separate injection device (not shown), before the exhaust gas enters the mixer box. The injection may alternatively be arranged within the mixer box at an appropriate location, e.g. in the first duct portion 206.

FIGS. 7 to 10 illustrate an example of a physical realization of a mixer box according to the invention. This example is related to the principle of the invention as shown in FIGS. 3 and 4.

As best can be seen in FIG. 9, the mixer box has an outer casing consisting of a circular inlet pipe 350 having a gas inlet 308 and a circular outlet pipe 351 having a gas outlet 309, which are joined by a main housing 352 having the shape like a pear in a section perpendicular to the axis of the pipes 350, 351. The exhaust gas enters into the mixer box through the inlet 308, flows through duct means within the mixer box, wherein liquid is injected into the gas, and leaves the mixer box through the outlet 309 for treatment e.g. SCR. The first pipe has a larger diameter than the second pipe, e.g. 300 mm vs 125 mm.

FIG. 7 showing the mixer box from the right side of FIG. 8, illustrates, how the gas from the gas inlet enters the two annular parallel duct sections 301a, 301b, which are the upstream duct sections in the first duct portion. Circumferentially these sections are limited by the partitions 321, 322 and 323 and 324 respectively. The remaining parts of the annular space are covered by a respective plate 353, 354, behind which the downstream duct sections 302a, 302b are located. The central part is covered by a front plate 313, behind which the second duct portion 306 is located. The arrow symbols illustrate that the flow through the upstream duct sections 301a, 301b is directed from the eyes of the observer of the figure, then turns 180° while flowing into the second duct portion 306 and flows against the eyes of the observer, and thereafter turns an another 180° and again flows in the direction away from the eyes of the observer. Finally the gas flows up through the main body 352 and out through the outlet pipe 351 to the gas outlet. 309.

The part of the outer wall 371 that is most close to the gas inlet 308 is formed by the inlet pipe 350.

In FIG. 8 it can be seen that fluid injection means is arranged at the rear end of the second duct portion 306 (the inner pipe).

In the perspective view of FIG. 9 the partitions 321 and 324 are left out for better visibility and understanding.

The split view of FIG. 10 depicts the various parts forming the mixer box. The main housing 352 consists of the rear end wall 356, the front end wall 358 and the circumferential wall 357. To openings 359, 360 in the front end wall 358 the inlet pipe 350 and the outlet pipe 351 are attached.

The second duct portion 306, i.e. the inner pipe, has a rear end plate 362 attached in an opening 361 in the rear end wall 356 of the housing. In this rear end plate 362 the fluid injection means 312 is mounted for injecting the liquid into the second duct portion 306. At the other end, the second duct portion 306 is covered by the front cover plate 313.

The rear end of the second duct portion 306 has two slits 311a, 311b diametrically facing each other and circumferentially extending between partitions 321, 322 and 323, 324 respectively. Likewise the front end of the second duct portion 306 has two slits 331a, 331b diametrically facing each other and circumferentially extending between partitions 321, 324 and 322, 323, respectively. The slits form the outlets 311a, 311b from the upstream duct sections 301a, 301b to the second duct portion 306 via the upstream re-mixing chamber and the outlets 331a, 331b from the second duct portion 306 to the downstream duct sections 302a, 302b, respectively.

The first (outer) duct portion 307 and the second duct portion 306 (inner) both have a rear part axially located within the main housing 352 and a front part axially located in the inlet pipe 350. Each of the slits 311a, 311b, 331a, 331b, extends almost over the half length of the inner pipe 306. The slits 311a, 311b axially extend over a major part of the main housing 352.

Details of the first duct portion 307 (not denoted a reference number in FIG. 10) can be seen at the top and bottom of the split view. At the rear part of the partitions 321, 322 there is a circularly shaped cover plate 363a attached to the outer ends of the partitions 321, 322. Further there is a rear end plate 364a attached to the rear ends of these partitions 321, 322. Correspondingly are the details 323, 324, 363b and 364b attached to each other. The circularly shaped cover plates 363a, 363b are axially located in the main housing 352 and reach from rear wall 356 to the front wall 358 of the main housing. These cover plates 363a, 363b together with the inlet pipe 350 constitute the outer wall 307 of the first duct portion 307. The front cover plate 354 is attached to the front ends of partitions 322, 323 and the front cover plate 353 is correspondingly attached to the partitions 321, 324.

The exhaust gas entering through the inlet pipe 350 flows solely through the upstream duct sections, i.e. the space between partitions 321, 322 and 323, 324 respectively. The gas is prevented from entering through the other annular parts by the front cover plates 353 and 354, and prevented from entering into the inner pipe by the front cover plate 313.

When reaching the rear parts of the upstream sections, the gas flows through the slits 311a, 311b, forming outlets of the upstream duct sections, and then through the inner pipe in the opposite direction. In the rear part of the second duct portion 306 (the inner pipe), the two parallel gas flows thereby is re-mixed and this part of the inner pipe thereby acts as an upstream re-mixing chamber.

At the front part of the inner pipe, the gas flows through the slits 331a, 331b into the downstream duct sections, i.e. the space between 321, 324 and 322, 323, respectively while again turning 180°. Thereby the gas flow again is split into two parallel gas flows in the direction towards the rear side of the mixer box.

When reaching the rear parts of the downstream duct sections the mixer box opens up for the gas to escape to the surrounding parts of the main housing 352. This because between the partitions 321 and 324 there are no circumferential cover plates, like those 363a, 363b bridging the partition 321 to 322 and 323 to 324, respectively. Likewise there is no such cover plate bridging partitions 322 and 323. Thereby the gas flow again is unified, whereby a downstream re-mixing chamber is formed within the main housing 352. Finally the gas flows from the main housing 352 through the outlet pipe 351 and the gas outlet 309 for SCR-treatment.

The front cover plate 313 covering the inner pipe will be hit by the inflowing gas and thereby heated. The other side is hit by the gas-flow containing the liquid droplets injected by the liquid injection means 312. The latter gas-flow thereby will be heated by the front cover plate 313. Also the front part of the inner pipe will act as a heat exchanger; heating the mixed gas and taking heat from the inflowing gas.

The invention claimed is:

1. A mixer box for mixing and complete or partial vaporization and/or decomposition of a liquid additive to an exhaust gas flow from a combustion engine, the mixer box comprising a gas inlet, a gas outlet and internal duct means establishing a gas flow path (A-H) from the gas inlet to the gas outlet, which duct means includes a first duct portion having an outer wall and an inner wall, the inner wall being surrounded by the outer wall, such that the gas flow path through said first duct portion thereby is established between said walls, said first duct portion is provided with at least two partitions extending between the outer wall and the inner wall and having a main planar surface extending in an axial direction, and separating said first duct portion into at least two duct sections of which at least one is an upstream duct section and at least one is a downstream duct section, wherein the duct means further includes a second duct portion, which second duct portion is entirely surrounded by the first duct portion, wherein a liquid injection means is arranged to inject liquid into the second duct portion, and where the liquid injection means is provided in an end wall of the second duct portion.

2. A mixer box according to claim 1, wherein the number of said partitions is at least four and the number of said duct sections is at least four, and wherein the upstream duct sections are every second duct section as seen in a circumferential direction and the downstream duct sections are every other duct section.

3. A mixer box according to claim 2, wherein the duct means includes an upstream re-mixing chamber and each upstream duct section has a gas outlet connected to and communicating with the upstream re-mixing chamber.

4. A mixer box according to claim 2, wherein the duct means includes a downstream re-mixing chamber and each downstream duct section has a gas outlet connected to and communicating with the downstream re-mixing chamber.

5. A mixer box according to claim 1, wherein the duct means is arranged to provide a first turn (C) of the gas flow direction 180.degree.

6. A mixer box according to claim 5, wherein the duct means is arranged to provide a second turn (E) of the gas flow direction at least 90.degree., which first (C) and second (E) turns are located at different positions in the gas flow path.

7. A mixer box according to claim 6, wherein the second duct portion has an outer wall that is common to the inner wall of the first duct portion.

8. A mixer box according to claim 6, wherein the duct means has said upstream duct section(s) located upstream of said second duct portion and said second duct portion located upstream of said downstream duct portion(s).

9. A mixer box according to claim 5, wherein the duct means has the second duct portion arranged upstream of the upstream duct section(s) and said upstream duct section(s) located upstream of said downstream duct section(s).

10. A mixer box according to claim 1, wherein the duct means includes a heating surface arranged to be hit by the gas flow and heat the gas.

11. A mixer box according to claim 10, wherein the duct means includes said second duct portion, which second duct portion is surrounded by the first duct portion which second duct portion has an outer wall that is common to the inner wall of the first duct portion, and wherein the heating surface includes a part of a said common wall and/or an end wall of the second duct portion, and where gas flowing in the first duct portion acts as a heat source for heating the heating surface.

12. A combustion engine system including a mixer box according to claim 1.

13. A vehicle, a vessel or a stationary plant including a combustion engine system according to claim 12.

14. A use of the mixer box according to claim 1, wherein said liquid additive contains urea and wherein the gas/liquid-mixture is used for selective catalytic reduction.

* * * * *